(12) United States Patent
Une (10) Patent No.: US 7,777,926 B2
(45) Date of Patent: Aug. 17, 2010

(54) IMAGE PROCESSING APPARATUS AND METHOD

(75) Inventor: Kiyoshi Une, Saitama (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1112 days.

(21) Appl. No.: 11/352,222

(22) Filed: Feb. 13, 2006

(65) Prior Publication Data

US 2007/0058225 A1    Mar. 15, 2007

(30) Foreign Application Priority Data

Sep. 14, 2005    (JP) ............................. 2005-266963

(51) Int. Cl.
    *G03F 3/08*    (2006.01)
(52) U.S. Cl. ..................... 358/521; 358/1.9; 358/518
(58) Field of Classification Search ................. 358/521, 358/1.9
    See application file for complete search history.

(56) References Cited

U.S. PATENT DOCUMENTS

| | | | | |
|---|---|---|---|---|
| 6,023,344 | A * | 2/2000 | Yabe ........................... | 358/296 |
| 6,057,932 | A * | 5/2000 | Yoshida et al. ............... | 358/1.9 |
| 6,796,629 | B2 * | 9/2004 | Komatsu et al. .............. | 347/15 |
| 6,997,543 | B2 * | 2/2006 | DeBaer ....................... | 347/43 |
| 7,206,525 | B2 * | 4/2007 | Kin et al. ...................... | 399/27 |
| 7,230,739 | B2 * | 6/2007 | Takahashi .................... | 358/2.1 |
| 7,236,276 | B2 * | 6/2007 | Nakane et al. ............... | 358/521 |
| 7,421,217 | B2 * | 9/2008 | Sugita et al. .................. | 399/27 |
| 7,454,056 | B2 * | 11/2008 | Hayaishi ..................... | 382/167 |
| 7,492,478 | B2 * | 2/2009 | Une ............................ | 358/1.9 |
| 2001/0007456 | A1 * | 7/2001 | Kuno et al. ................... | 347/15 |
| 2004/0095591 | A1 * | 5/2004 | Takahashi .................... | 358/1.9 |
| 2004/0119995 | A1 * | 6/2004 | Nishi et al. ................... | 358/1.9 |
| 2004/0246545 | A1 * | 12/2004 | Touura ........................ | 358/521 |
| 2006/0233559 | A1 * | 10/2006 | Sugita et al. .................. | 399/27 |
| 2006/0262332 | A1 * | 11/2006 | Higashikata ................. | 358/1.9 |

FOREIGN PATENT DOCUMENTS

| | | |
|---|---|---|
| JP | 09-037094 A | 2/1997 |
| JP | 2003125225 A | 4/2003 |
| JP | 2004159308 A | 6/2004 |

OTHER PUBLICATIONS

Japanese Office Action mailed Jan. 26, 2010 in Japanese Patent Application No. 2005-266963.

* cited by examiner

*Primary Examiner*—Mark K Zimmerman
*Assistant Examiner*—Dung D Tran
(74) *Attorney, Agent, or Firm*—Sughrue Mion, PLLC (57) ABSTRACT

An image processing apparatus for converting inputted image data to image data in accordance with characteristics of an image forming unit, including: a first gradation correction unit which performs a gradation correction processing of the inputted image data in accordance with the characteristics of the image forming unit; a total toner amount control unit which performs a total toner amount control processing of the image data which has undergone at least the gradation correction processing executed by the first gradation correction unit; and a second gradation correction unit which performs a gradation correction processing in accordance with the characteristics of the image forming unit with respect to the image data which has undergone at least the total toner amount control processing executed by the total toner amount control unit.

20 Claims, 9 Drawing Sheets

IMAGE PROCESSING APPARATUS AND METHOD

BACKGROUND OF THE INVENTION

1. Field of the Invention

The present invention relates to an image processing apparatus and method, and more particularly to an image processing apparatus and method for performing an image processing including control of a total toner amount.

2. Description of the Related Art

Figure 6:
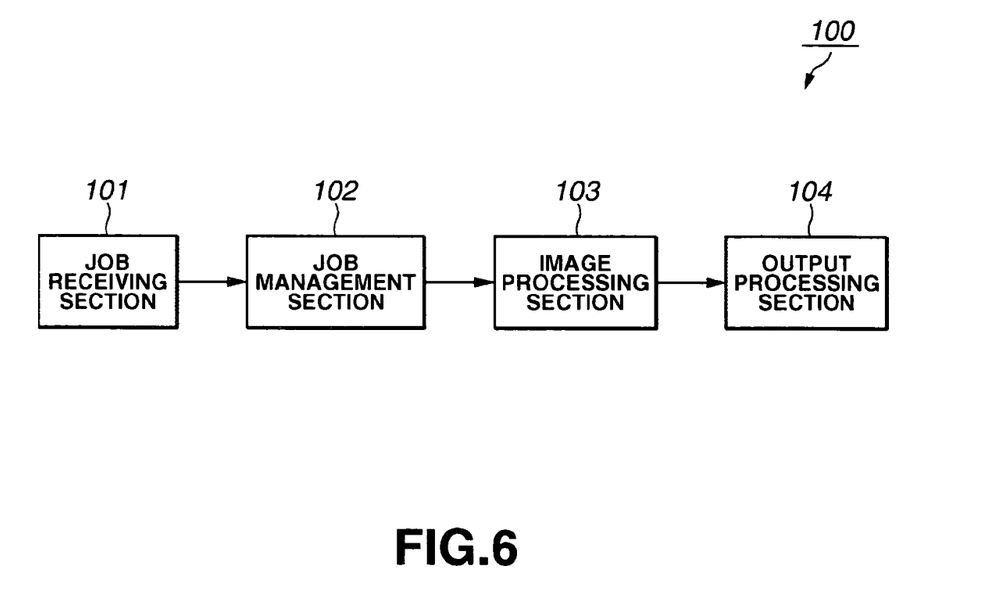
FIG. 6 is a diagram showing a schematic structure of an image forming apparatus.

Generally, an image forming apparatus such as a printer has a structure as shown in FIG. 6. As shown in FIG. 6, an image forming apparatus 100 is comprised of a job receiving section 101, a job management section 102, an image processing section 103, and an output processing section 104.

The job receiving section 101 receives a print job which is issued by an information processing device such as a personal computer. The job management section 102 holds the job received by the job receiving section 101 and manages its execution sequence. The image processing section 103 executes an image processing of image data included in the job, of which execution is instructed by the job management section 102, in accordance with the image data and the output processing section 104. The output processing section 104 forms an image on paper with toner on the basis of the image data which has undergone the image processing executed by the image processing section 103.

Figure 7:
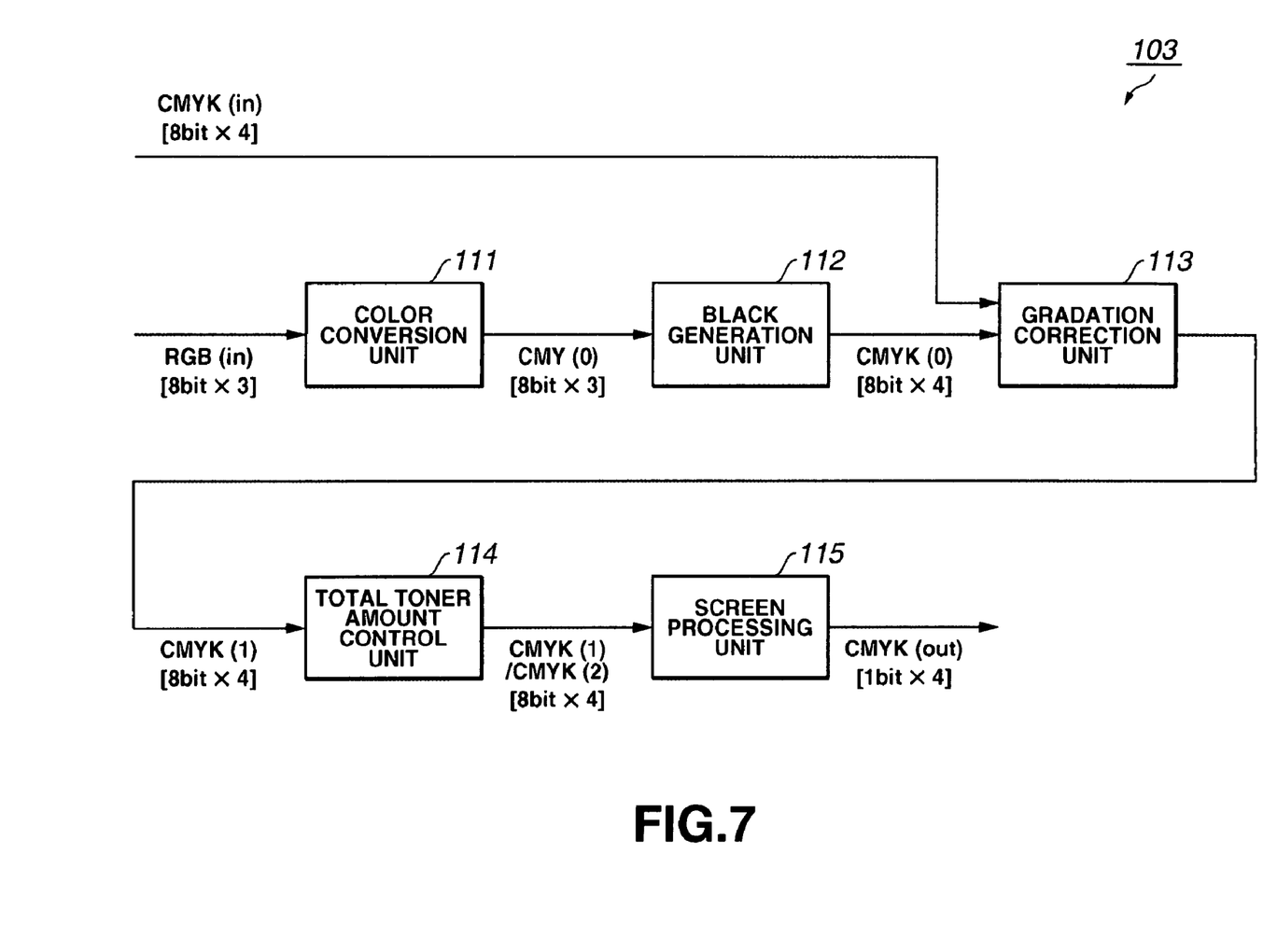
FIG. 7 is a block view showing a functional structure of an image processing section 103.

Here, the image processing section 103 will be described in detail. FIG. 7 is a block view showing a functional structure of the image processing section 103. As shown in FIG. 7, the image processing section 103 is comprised of a color conversion unit 111, a black generation unit 112, a gradation correction unit 113, a total toner amount control unit 114, and a screen processing unit 115.

The color conversion unit 111 converts image data RGB (in) indicated by individual colors R (Red), G (Green) and B (Blue) included in a job to image data CMY (0) which is indicated by individual colors C (Cyan), M (Magenta) and Y (Yellow). This conversion employs, for example, a DLUT (Direct Look Up Table). In the notations RGB (in) and CMY (0) indicating the image data in the drawing, the characters in parentheses are symbols used for the sake of discrimination from other image data.

The black generation unit 112 converts the image data CMY (0) to image data CMYK (0) indicated by individual colors C, M, Y, and K (Black). The processing by the black generation unit 112 is performed by performing a processing for replacing under colors indicated by CMY called as the UCR (Under Color Removal) with color K.

The gradation correction unit 113 conducts gradation correction of the image data CMYK (0), and outputs the corrected image data CMYK (1). In a case where the image data contained in the job is CMYK-based image data CMYK (in), the image data CMYK (in) is inputted to the gradation correction unit 113. The correction to be effected by the gradation correction unit 113 is made in accordance with the characteristics of the output processing section 104, and a TRC (Tone Reproduction Curve) is used to improve color reproducibility in the output processing section 104.

In a case where the output processing section 104 forms an image on the basis of the image data CMYK (1) and the total toner amount exceeds the ability of the output processing section 104, the total toner amount control unit 114 converts the image data CMYK (1) to image data CMYK (2) of which total toner amount is suppressed. The toner amount to be placed on paper by the output processing section 104 is limited because of its ability. Therefore, when the image data CMYK (1) is used as it is, there is a possibility that a total amount of the individual color toners exceeds the limitation. For example, when it is assumed that a maximum value of the toner amounts of the individual colors is 100%, the total toner amount becomes 400% at most. Meanwhile, when it is assumed that a maximum total toner amount which can be processed by the output processing section 104 is 240%, it is apparent that there is a possibility that the total toner amount exceeds 240%. In this case, the total toner amount control unit 114 generates the image data CMYK (2) which has the image data CMYK (1) corrected such that the total toner amount becomes 240% or less.

The screen processing unit 115 performs a screen processing of the image data CMYK (2), generates image data CMYK (out), and outputs the generated image data CMYK (out) to the output processing section 104.

It should be noted that a structure similar to the structure of the image processing section 103 described here is described in Japanese Patent Application Laid-Open No. 9-37094.

Then, an image processing section 103' having a structure different from that of the image processing section 103 will be described. It should be noted that the image processing section 103' can be used instead of the image processing section 103 used in the structure shown in FIG. 6.

Figure 8:
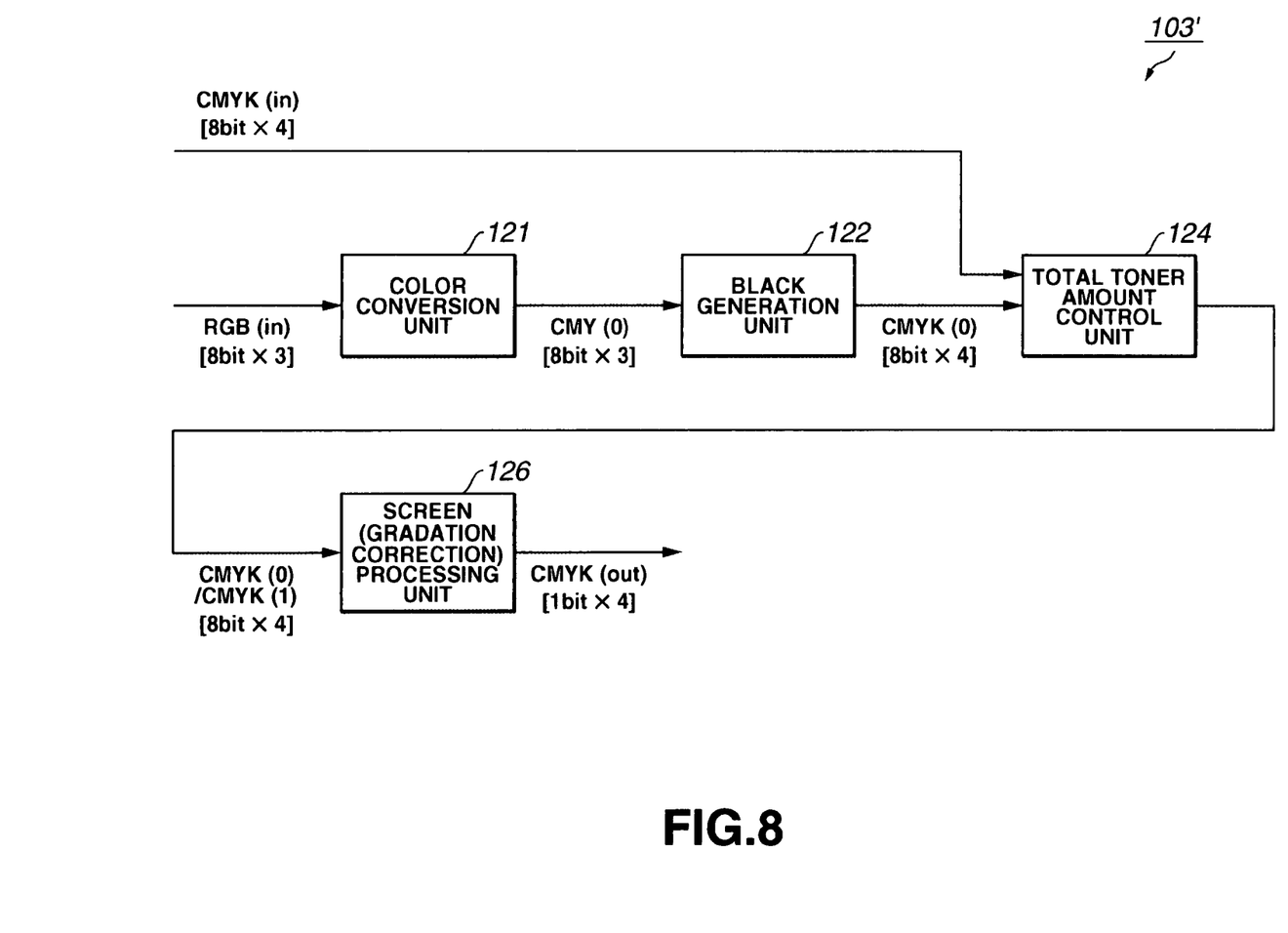
FIG. 8 is a block view showing a functional structure of an image processing section 103'.

FIG. 8 is a block view showing a functional structure of the image processing section 103'. As shown in FIG. 8, the image processing section 103' is comprised of a color conversion unit 121, a black generation unit 122, a total toner amount control unit 124, and a screen processing unit 126.

The color conversion unit 121 converts image data RGB (in) which is indicated by individual colors R, G and B included in a job to image data CMY (0) which is indicated by individual colors C, M and Y. This conversion employs, for example, a DLUT (Direct Look Up Table). In the notations RGB (in) and CMY (0) indicating the image data in the drawing, the characters in parentheses are symbols used for the sake of discrimination from other image data.

The black generation unit 122 converts the image data CMY (0) to image data CMYK (0) which is indicated by individual colors C, M, Y and K. The processing by the black generation unit 122 is performed by performing a processing for replacing under colors indicated by CMY called as the UCR (Under Color Removal) with color K.

In a case where an image is formed by the output processing section 104 on the basis of the image data CMYK (0) and its total toner amount exceeds the ability of the output processing section 104, the total toner amount control unit 124 converts the image data CMYK (0) to image data CMYK (1) of which total toner amount is suppressed. And, when the image data contained in a job is CMYK-based image data CMYK (in), the image data CMYK (in) is input to the total toner amount control unit 124.

The screen processing unit 126 performs a screen processing of the image data CMYK (0) or the image data CMYK (1), generates image data CMYK (out), and outputs the generated image data CMYK (out) to the output processing section 104. And, the screen processing unit 126 also performs gradation correction in accordance with the characteristics of the output processing section 104 at the time of the screen processing.

Incidentally, the configuration in that the gradation correction is performed by the gradation correction unit 113 as in the image processing section 103 shown in FIG. 7 has a possibility that the image quality of an outputted image is degraded in comparison with the configuration in that the gradation correction is performed by the screen processing unit 126 in the image processing section 103' shown in FIG. 8.

Figure 9A:
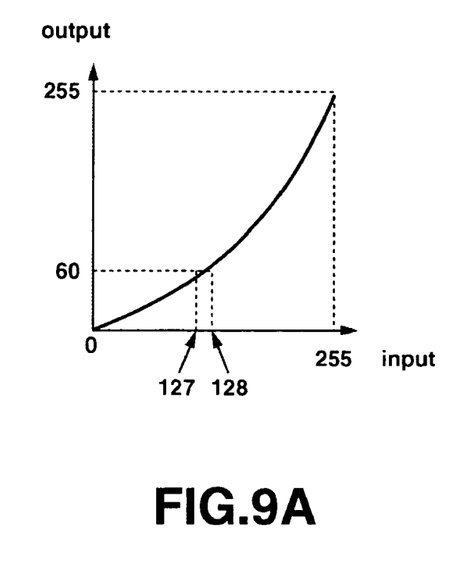
FIG. 9A through FIG. 9D are views illustrating a gradation correction processing.

For example, when it is assumed that the gradation correction is performed by the gradation correction unit 113 using a TRC shown in FIG. 9A, both image data having a value (input value) 127 and image data having a value (input value) 128 are converted to image data having a value (output value) 60. It results from the precision of the TRC, and under normal circumstances, the individual image data must be originally converted to image data having values (output values) 59.5 and 60.4 respectively. But they are converted to image data having a value (output value) 60 because of the precision of the TRC. In other words, it means that there is no gradation between the image data having the value (input value) 127 and the image data having the value (input value) 128.

Figure 9B:
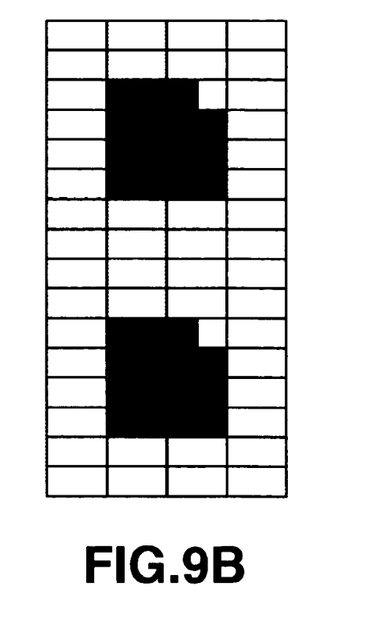

As a result, even if the screen had 256 gradations or more, the image to be outputted is an image having less than 256 gradations. For example, the screen shown in FIG. 9B can have one pixel divided to eight, and a total number of gradations is 256 (32×8).

Figure 9C:
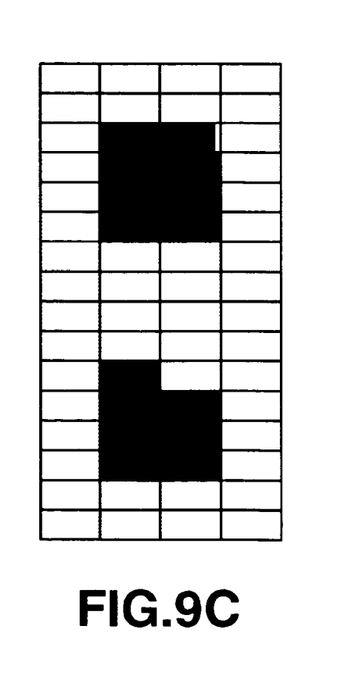
Figure 9D:
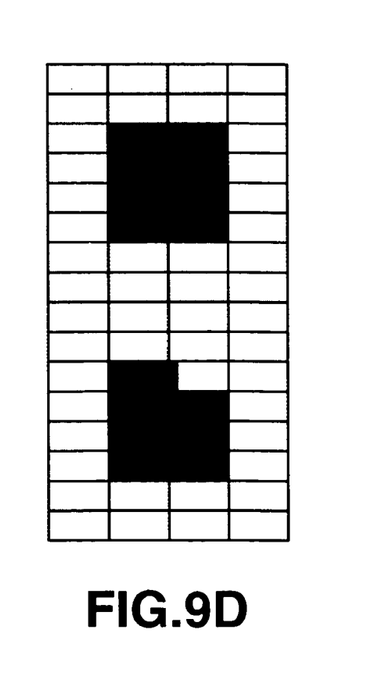

Meanwhile, in a case where gradation correction is performed by the screen processing unit 126 in the image processing section 103', both the image data CMYK (0) and the image data CMYK (1) to be inputted to the screen processing unit 126 have 256 gradations because the gradation correction is not performed in a previous stage of the screen processing unit 126. And, if the gradation correction of the image data having the value 127 results in a value 59.5, the image has 14+⅞(59.5×⅜) pixels lighted when the value 59.5 is normalized to a screen size as shown in FIG. 9C. And, if the gradation correction of the image data having the value 128 results in a value 60.4, the image has 15+⅛(60.4×⅜) pixels lighted when the value 60.4 is normalized to a screen size as shown in FIG. 9D. Thus, there is a difference in gradation between the above images.

The above-described configuration in that the gradation correction is performed by the gradation correction unit has a possibility that the image quality of the output image is deteriorated in comparison with the configuration in that the gradation correction is performed by the screen processing unit.

And, the configuration in that the total toner amount is controlled by the total toner amount control unit 124 prior to the gradation correction (by the screen processing unit 126) in the image processing section 103' shown in FIG. 8 has a possibility that the image quality of the output image is degraded in comparison with the configuration in that the total toner amount is controlled by the total toner amount control unit 114 after the gradation correction by the gradation correction unit 113 in the image processing section 103 shown in FIG. 7.

For example, it is assumed that the total toner amount which can be processed by the output processing section 104 is 240%, and the image data CMYK (0) to be inputted to the total toner amount control unit 124 has a total amount of 320% with individual colors of 80%. Because the total toner amount of the image data CMYK (0) exceeds 240%, the total toner amount control unit 124 converts the image data CMYK (0) to image data CMYK (1) having a total amount of 240% with individual colors of 60%. This image data CMYK (1) is input to the screen processing unit 126, but there is a possibility that the total toner amount of the image data CMYK (out) to be outputted becomes smaller because the screen processing unit 126 performs the gradation correction. Generally, the total toner amount tends to become small by the gradation correction, and data of a total toner amount of 240% becomes, for example, data of a total toner amount of 160%. In other words, the total toner amount of the image data CMYK (out) to be outputted becomes 160%, and the mage is formed on the basis of the image data CMYK (out) having the total toner amount of 160% although the output processing section 104 has the processing ability of up to a total toner amount of 240%, resulting in degradation of its image quality.

Meanwhile, it is assumed that the total toner amount control is performed by the total toner amount control unit 114 after the gradation correction by the gradation correction unit 113, and image data CMYK (0) having a total amount of 320% with individual colors of 80% is inputted to the gradation correction unit 113. Then, image data of which total toner amount has become small by the gradation correction effected by the gradation correction unit 113, for example, image data CMYK (1) having a total amount of 280% with individual colors of 70%, is output from the gradation correction unit 113. And, this image data CMYK (1) has a total toner amount of exceeding 240%, so that the total toner amount is controlled by the total toner amount control unit 114. As a result, image data CMYK (2) having a total amount of 240% with individual colors of 60% is output. The processing ability of the output processing section 104 is a total toner amount of 240%, so that an image based on the image data CMYK (2) is formed by using the output processing section 104 up to the limit of its processing ability.

As described above, the configuration in that the total toner amount control is performed prior to the gradation correction has a possibility that the image quality of the output image is degraded in comparison with the configuration in that the total toner amount control is performed after the gradation correction.

As described above, according to the image processing by the image forming apparatus, the gradation correction is performed in compliance with the ability of the output processing section at the time of the screen processing, so that an output image having better gradation than that obtained when the gradation correction is performed prior to the screen processing can be obtained. Meanwhile, in a case where the total toner amount control is performed before the gradation correction, the total toner amount control cannot be performed appropriately, and there is a possibility that the image quality of the output image is degraded.

Accordingly, the present invention provides an image processing apparatus and method capable of performing an image processing that can perform appropriate total toner amount control even when the total toner amount control is performed prior to gradation correction.

SUMMARY OF THE INVENTION

An aspect of the present invention provides an image processing apparatus for converting inputted image data to image data in accordance with characteristics of an image forming unit, including: a first gradation correction unit which performs a gradation correction processing of the inputted image data in accordance with the characteristics of the image forming unit; a total toner amount control unit which performs a total toner amount control processing of the image data which has undergone at least the gradation correction processing executed by the first gradation correction unit; and a second gradation correction unit which performs a gradation correction processing in accordance with the characteristics of the image forming unit with respect to the image data which has undergone at least the total toner amount control processing executed by the total toner amount control unit.

Another aspect of the present invention provides an image processing apparatus for converting inputted image data to image data in accordance with characteristics of an image forming unit, including: a first gradation correction unit which performs a gradation correction processing of the inputted image data in accordance with the characteristics of the image forming unit; a total toner amount control unit which determines whether or not it is necessary to perform a total toner amount control processing on the basis of the image data which has undergone the gradation correction processing executed by the first gradation correction unit; and a second gradation correction unit which performs a gradation correction processing in accordance with the characteristics of the image forming unit with respect to the image data which has undergone the total toner amount control processing executed by the total toner amount control unit in a case where it is determined by the total toner amount control unit that the total toner amount control processing is necessary, and performs a gradation correction processing in accordance with the characteristics of the image forming unit with respect to the image data which has not undergone the gradation correction processing executed by the first gradation correction unit in a case where it is determined by the total toner amount control unit that the total toner amount control processing is not necessary.

Still another aspect of the present invention provides an image processing apparatus which is provided with a plurality of correction units including a screen processing unit which performs a gradation correction processing and a screen processing, and converts inputted image data to image data in accordance with characteristics of an image forming unit, including a total toner amount control unit which performs a total toner amount control processing, wherein the total toner amount control unit is disposed in a previous stage of the plurality of correction units including at least the screen processing unit.

Still another aspect of the present invention provides an image processing method which is executed by an image processing apparatus for converting inputted image data to image data in accordance with characteristics of an image forming unit, including executing an image processing in order of a first gradation correction processing in accordance with the characteristics of the image forming unit, a total toner amount control processing for controlling a total toner amount, and a second gradation correction processing in accordance with the characteristics of the image forming unit.

Still another aspect of the present invention provides an image processing method which is executed by an image processing apparatus for converting inputted image data to image data in accordance with characteristics of an image forming unit, including: performing the first gradation correction processing in accordance with the characteristics of the image forming unit with respect to the inputted image data, and judging whether or not it is necessary to perform the total toner amount control processing on the basis of the image data which has undergone the first gradation correction processing; performing the second gradation correction processing in accordance with the characteristics of the image forming unit with respect to the image data which has undergone the total toner amount control processing when it is judged that the total toner amount control processing is necessary; and performing the second gradation correction processing in accordance with the characteristics of the image forming unit with respect to the image data which has not undergone the first gradation correction processing when it is judged that the total toner amount control processing is unnecessary.

Still another aspect of the present invention provides an image control method which is performed by an image processing apparatus which is provided with a plurality of correction units including a screen processing unit for performing a gradation correction processing and a screen processing, and converts inputted image data to image data in accordance with characteristics of an image forming unit, including: performing a total toner amount control processing in a stage prior to a plurality of correction processings including at least a gradation correction processing effected by the screen processing unit.

BRIEF EXPLANATION OF THE DRAWINGS

Embodiments of the present invention will be described in detail based on the following figures, wherein.

DETAILED DESCRIPTION OF THE INVENTION

Embodiments of an image processing apparatus and method according to the invention will be described in detain with reference to the accompanying drawings.

Embodiment 1

Figure 1:
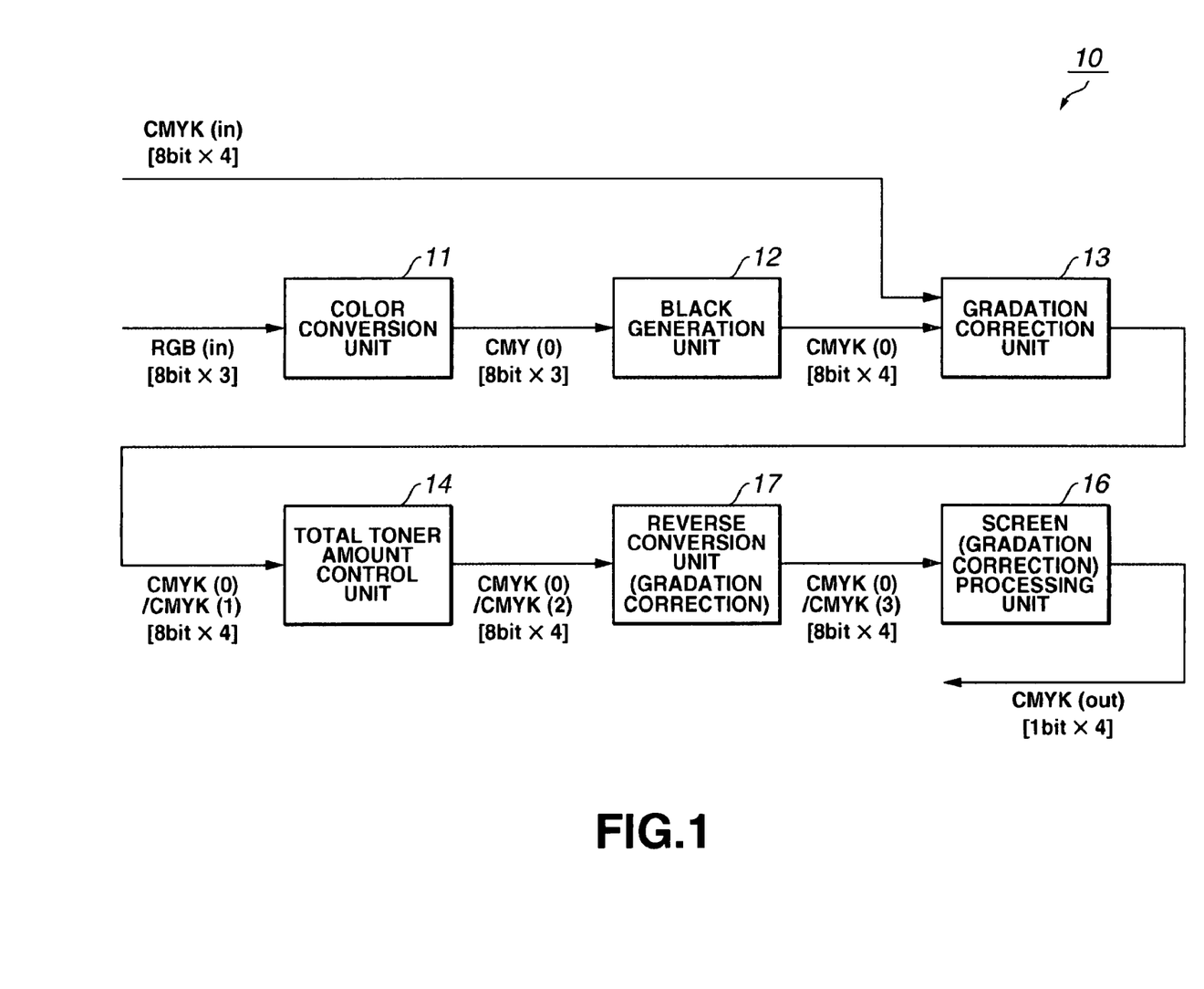
FIG. 1 is a block view showing a functional structure of an image processing section to which the invention is applied.

FIG. 1 is a block view showing a functional structure of an image processing section to which the invention is applied. It should be noted that the image processing section 10 shown in FIG. 1 is used instead of the image processing section 103 in the image forming apparatus 100 shown in FIG. 6.

As shown in FIG. 1, the image processing section 10 is comprised of a color conversion unit 11, a black generation unit 12, a gradation correction unit 13, a total toner amount control unit 14, a reverse conversion unit 17, and a screen processing unit 16.

The color conversion unit 11 converts image data RGB (in) indicated by individual colors R, G and B included in a job to image data CMY (0) which is indicated by individual colors C, M and Y. This conversion employs, for example, a DLUT (Direct Look Up Table). In notations RGB (in) and CMY (0) indicating image data in the drawing, the characters in parentheses are symbols used for the sake of discrimination from other image data.

The black generation unit 12 converts the image data CMY (0) to image data CMYK (0) indicated by individual colors C, M, Y, and K. The processing by the black generation unit 12 is performed by performing a processing for replacing under colors indicated by CMY called as the UCR (Under Color Removal) with color K.

The gradation correction unit 13 performs gradation correction of the image data CMYK (0), and outputs the corrected image data CMYK (1) and the image data CMYK (0) prior to the correction. In a case where the image data contained in the job is CMYK-based image data CMYK (in), the image data CMYK (in) is inputted to the gradation correction unit 13. The correction to be effected by the gradation correction unit 13 is in accordance with the characteristics of the output processing section 104, and a TRC (Tone Reproduction Curve) is used to improve color reproducibility in the output processing section 104. For the gradation correction by the gradation correction unit 13, an LUT (Look UP Table) is used.

In a case where an image is formed on the basis of the image data CMYK (1) by the output processing section 104 and its total toner amount exceeds the ability of the output processing section 104, the total toner amount control unit 14 converts the image data CMYK (1) to image data CMYK (2) of which total toner amount is suppressed.

Figure 2A:
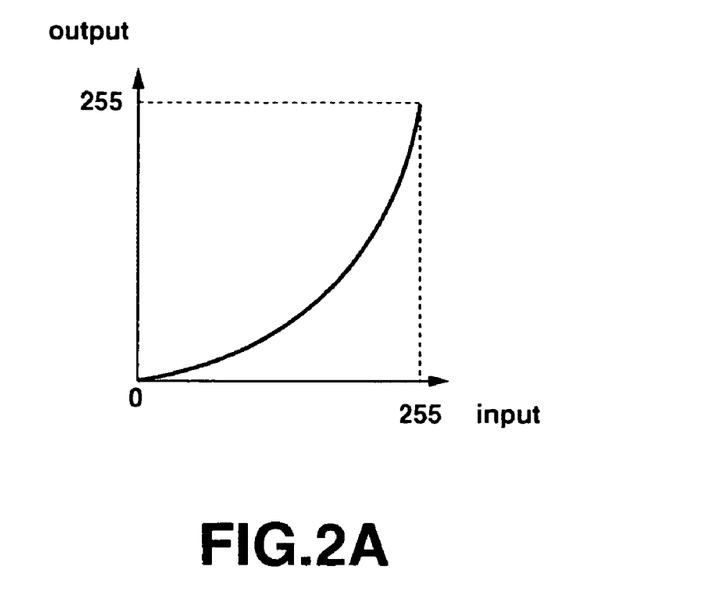
FIG. 2A and FIG. 2B are diagrams illustrating a reverse conversion processing effected by a reverse conversion unit 17.
Figure 2B:
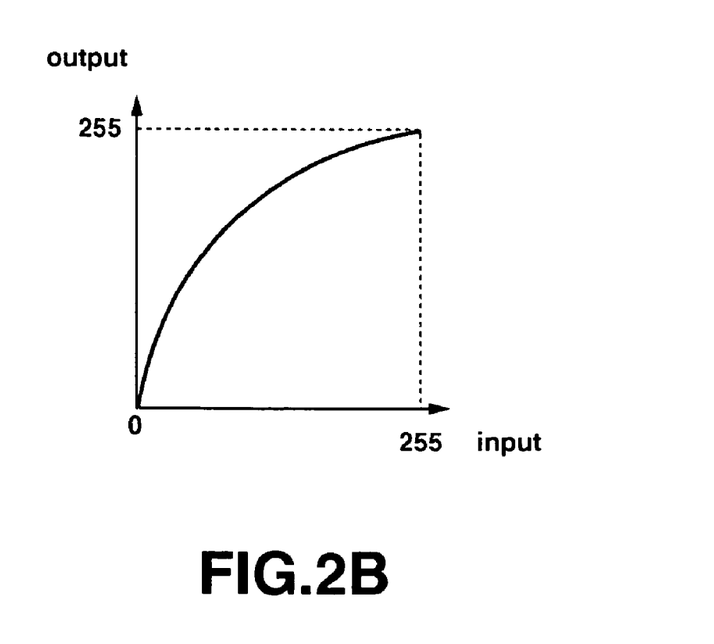

The reverse conversion unit 17 performs reverse conversion of the gradation correction with respect to the image data CMYK (2) of which total toner amount has been suppressed by the total toner amount control unit 14 and outputs the reverse-converted image data CMYK (3). The reverse conversion effected by the reverse conversion unit 17 is reverse conversion in correspondence with the conversion effected by the gradation correction unit 13 and is in accordance with the characteristics of the output processing section 104. For example, where the TRC which is used for the gradation correction by the gradation correction unit 13 has the characteristics shown in FIG. 2A, the reverse conversion unit 17 performs the conversion which is indicated by a curve having the characteristics shown in FIG. 2B. And, the LUT is used for the conversion processing by the reverse conversion unit 17. The LUT may have precision similar to that of the LUT used by the gradation correction unit 13, but may be made to have precision higher than that of the LUT used by the gradation correction unit 13, such that possible degradation in precision of the image data by the total toner amount suppression processing performed by the total toner amount control unit 14 can be compensated.

The screen processing unit 16 performs a screen processing of the image data CMYK (3) or the image data CMYK (0) to generate image data CMYK (out), and outputs the generated image data CMYK (out) to the output processing section 104. At the time of the screen processing, the screen processing unit 16 also performs the gradation correction in accordance with the characteristics of the output processing section 104.

Figure 3:
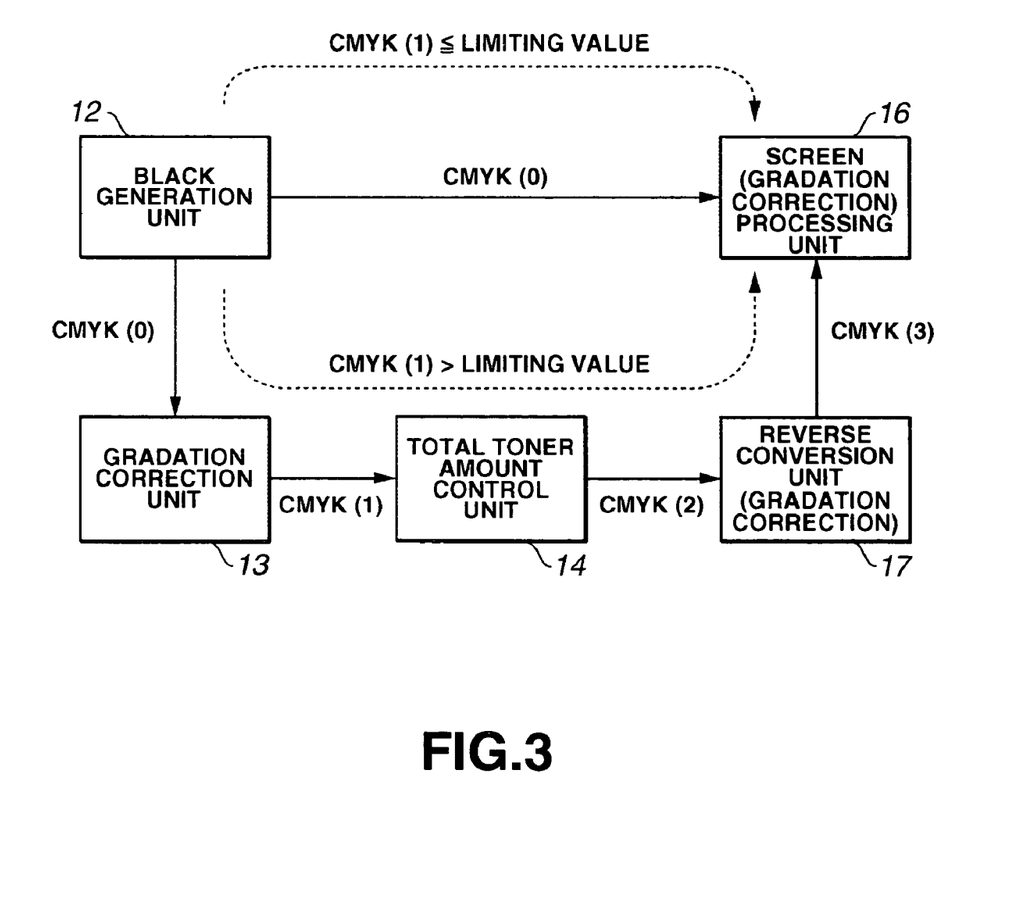
FIG. 3 is a diagram illustrating an operation of an image processing section 10.

Here, an operation of the image processing section 10 will be described. FIG. 3 is a diagram illustrating the operation of the image processing section 10.

In the image processing section 10, the image data CMYK (0) outputted by the black generation unit 12 is subjected to a different processing on the basis of the image data CMYK (1) resulting from the gradation correction executed by the gradation correction unit 13.

In a case where the total toner amount of the image data CMYK (1) exceeds a limiting value indicating the ability of the output processing section 104, namely where it is necessary to suppress the total toner amount of the image data CMYK (1) by the total toner amount control unit 14, the total toner amount is suppressed by the total toner amount control unit 14, and the resulting output image data CMYK (2) is subjected to the reverse conversion processing executed by the reverse conversion unit 17. And, the reverse-converted image data CMYK (3) is subjected to the screen processing executed by the screen processing unit 16.

Meanwhile, in a case where the total toner amount of the image data CMYK (1) is not more than the limiting value indicating the ability of the output processing section 104, namely where it is not necessary to suppress the total toner amount of the image data CMYK (1) by the total toner amount control unit 14, the image data CMYK (0) outputted by the black generation unit 12 is subjected to a screen processing by the screen processing unit 16. In this case, the image data CMYK (0) outputted by the black generation unit 12 is inputted to the screen processing unit 16 without being processed by any of the gradation correction unit 13, the total toner amount control unit 14, and the reverse conversion unit 15.

Then, an operation of the image processing section 10 will be described with reference to specific numerical values. Two examples will be described below, but it should to noted that the image data CMYK (0) to be outputted by the black generation unit 12 in either example is data having a total toner amount of 320% with individual colors of 80%, the output processing section 104 has a limiting value of 240%, and the total toner amount control unit 14 generates image data with the total toner amount suppressed by multiplying the individual colors of inputted image data by a prescribed ratio (240[%]/total toner amount [%] of inputted image data). In Example 1, it is assumed that the TRC used by the gradation correction unit 13 and the screen processing unit 16 converts image data corresponding to a toner amount of 80% to a toner amount of 60% and image data corresponding to a toner amount of 60% to a toner amount of 40% for the individual colors. In Example 2, it is assumed that the TRC used by the gradation correction unit 13 and the screen processing unit 16 converts image data corresponding to a toner amount of 80% to a toner amount of 75% and image data corresponding to a toner amount of 70% to a toner amount of 60% for the individual colors.

In Example 1, when image data CMYK (0) in that a total toner amount becomes 320% with individual colors 80% is subjected to the gradation correction by the gradation correction unit 13, it is converted to image data CMYK (1) in that a total toner amount is 240% with individual colors of 60%. This image data CMYK (1) has a total toner amount of 240% which does not exceed the limiting value of the output processing section 104, so that the image data CMYK (0) is inputted to the screen processing unit 16, the screen processing as well as the gradation correction are performed by the screen processing unit 16, and image data CMYK (out) having a total toner amount of 240% with individual colors of 60% is outputted.

In Example 2, image data CMYK (0) requiring a total toner amount of 320% with individual colors of 80% is converted to image data CMYK (1) requiring a total toner amount of 300% with individual colors of 75% when gradation correction is performed by the gradation correction unit 13. This image data CMYK (1) requires a total toner amount of 300% which is not smaller than the limiting value of the output processing section 104, so that the image data CMYK (1) is subjected to processing for suppressing the total toner amount by the total toner amount control unit 14. And, the total toner amount control unit 14 outputs image data CMYK (2) requiring a total toner amount of 240% with individual colors of 60%. When this image data CMYK (2) is subjected to reverse conversion by the reverse conversion unit 17, the reverse conversion unit 17 outputs image data CMYK (3) requiring a total toner amount of 280% with individual colors of 70% because the reverse conversion by the reverse conversion unit 17 is reverse inversion of the gradation correction by the gradation correction unit 13. And, the image data CMYK (3) is inputted to the screen processing unit 16, the screen processing as well as the gradation correction are performed by the screen processing unit 16, and image data CMYK (out) requiring a total toner amount of 240% with individual colors of 60% is outputted.

Embodiment 2

It was described in Embodiment 1 that the total toner amount was controlled in the stage after the black generation processing by the black generation unit 12. But, it should be noted that the image processing, to which the present invention is applied, can change arbitrarily a contextual relation with the total toner amount control with respect to the processing which can perform reverse conversion. As an example of such a configuration, the execution of the total toner amount control prior to the black generation processing will be described in Embodiment 2.

Figure 4:
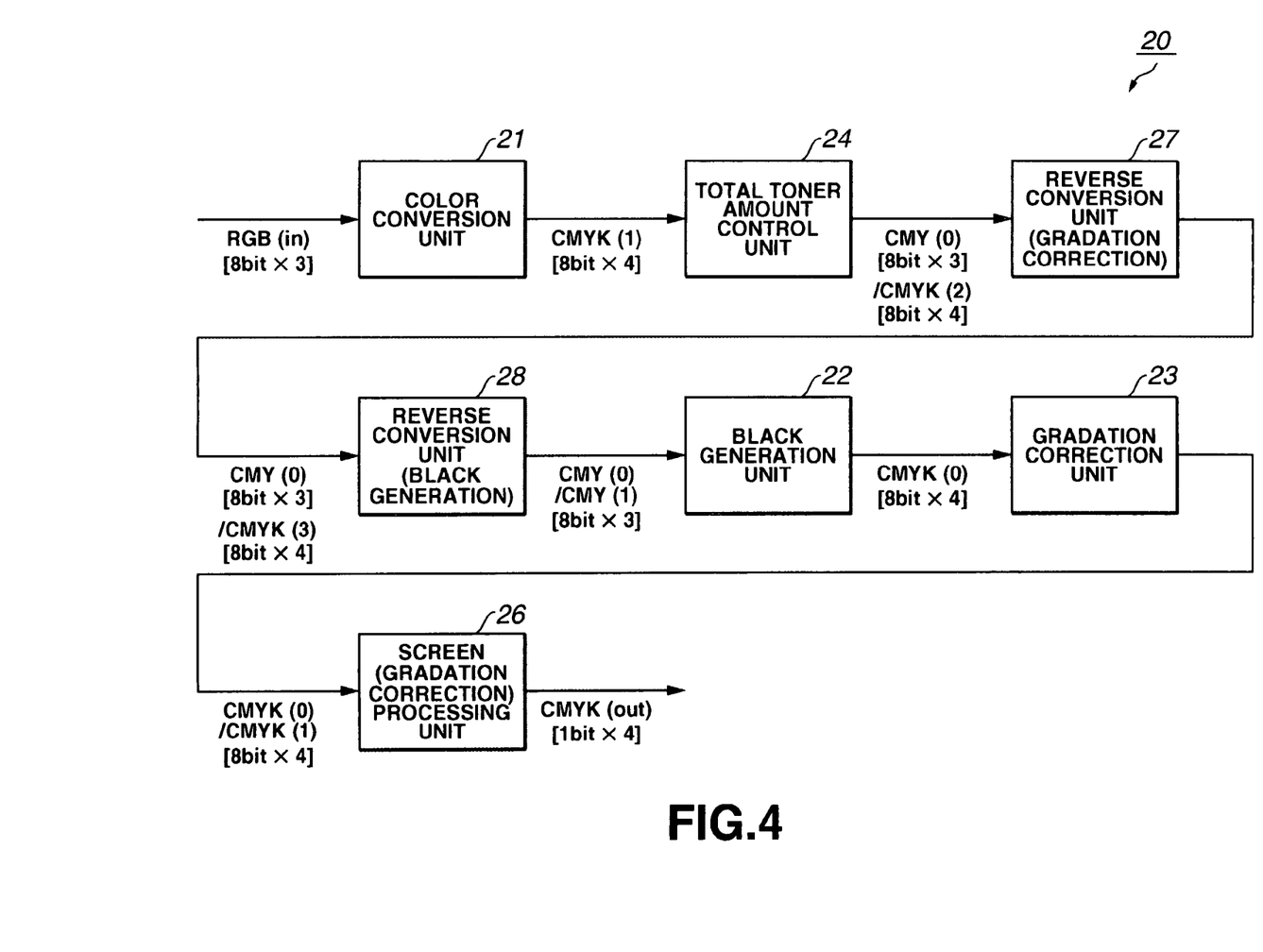
FIG. 4 is a block view showing a functional structure of an image processing section in Embodiment 2.

FIG. 4 is a block view showing a functional structure of an image processing section in Embodiment 2. It should be noted that an image processing section 20 shown in FIG. 4 is used instead of the image processing section 103 in the image forming apparatus 100 shown in FIG. 6.

As shown in FIG. 4, the image processing section 20 is comprised of a color conversion unit 21, a total toner amount control unit 24, a reverse conversion unit 27, a reverse conversion unit 28, a black generation unit 22, a gradation correction unit 23, and a screen processing unit 26.

The color conversion unit 21 converts image data RGB (in) indicated by individual colors R, G and B included in a job to image data CMY (0) which is indicated by individual colors C, M and Y. This conversion employs, for example, a DLUT (Direct Look Up Table). In the notations RGB (in) and CMY (0) indicating image data in the drawing, the characters in parentheses are symbols used for the sake of discrimination from other image data.

In a case where the output processing section 104 forms an image on the basis of the image data CMY (0) and the total toner amount exceeds the ability of the output processing section 104, the total toner amount correction unit 24 converts the image data CMYK (1) to image data CMYK (2) of which total toner amount is suppressed.

The reverse conversion unit 27 performs reverse conversion of the gradation correction of the image data CMYK (2) of which total toner amount is suppressed by the total toner amount correction unit 24 and outputs the reverse-converted image data CMYK (3). The reverse conversion effected by the reverse conversion unit 27 is reverse conversion in correspondence with the conversion executed by the gradation correction unit 23, and is in accordance with the characteristics of the output processing section 104. The reverse conversion processing executed by the reverse conversion unit 27 may have precision similar to that of the gradation correction processing executed by the gradation correction unit 23, but may have precision higher than that of the gradation correction processing executed by the gradation correction unit 23, such that degradation in precision of the image data due to the total toner amount suppression processing by the total toner amount control unit 24 can be compensated.

The reverse conversion unit 28 performs reverse conversion of a black generation processing with respect to the image data CMYK (3) which has undergone the reverse conversion processing executed by the reverse conversion unit 27, and outputs the reverse-converted image data CMY (1). The reverse conversion executed by the reverse conversion unit 28 is reverse conversion in correspondence with the conversion executed by the black generation unit 22. The reverse conversion processing executed by the reverse conversion unit 28 may have the same precision as that of the black generation processing executed by the black generation unit 22, but may be made to have precision higher than that of the black generation processing executed by the black generation unit 22, such that degradation in precision of the image data due to the total toner amount suppression processing by the total toner amount control unit 24 can be compensated.

The black generation unit 22 converts image data CMY (1) or image data CMY (0) outputted by the reverse conversion unit 28 to image data CMYK (0) indicated by individual colors C, M, Y, and K. The processing by the black generation unit 12 is performed by executing a processing for replacing under colors indicated by CMY called as the UCR (Under Color Removal) with color K.

The gradation correction unit 23 performs gradation correction of the image data CMYK (0) which has undergone the black generation processing by the black generation unit 22 and outputs the corrected image data CMYK (1). The correction to be executed by the gradation correction unit 13 is in accordance with the characteristics of the output processing section 104, and a TRC (Tone Reproduction Curve) is used to improve color reproducibility in the output processing section 104. For the gradation correction by the gradation correction unit 13, an LUT (Look UP Table) is used.

The screen processing unit 26 performs a screen processing of the image data CMYK (0) which has undergone the black generation processing by the black generation unit 22 to generate image data CMYK (out), and outputs the generated image data CMYK (out) to the output processing section 104. And, the screen processing unit 26 also performs gradation correction in accordance with the characteristics of the output processing section 104 at the time of the screen processing.

Figure 5:
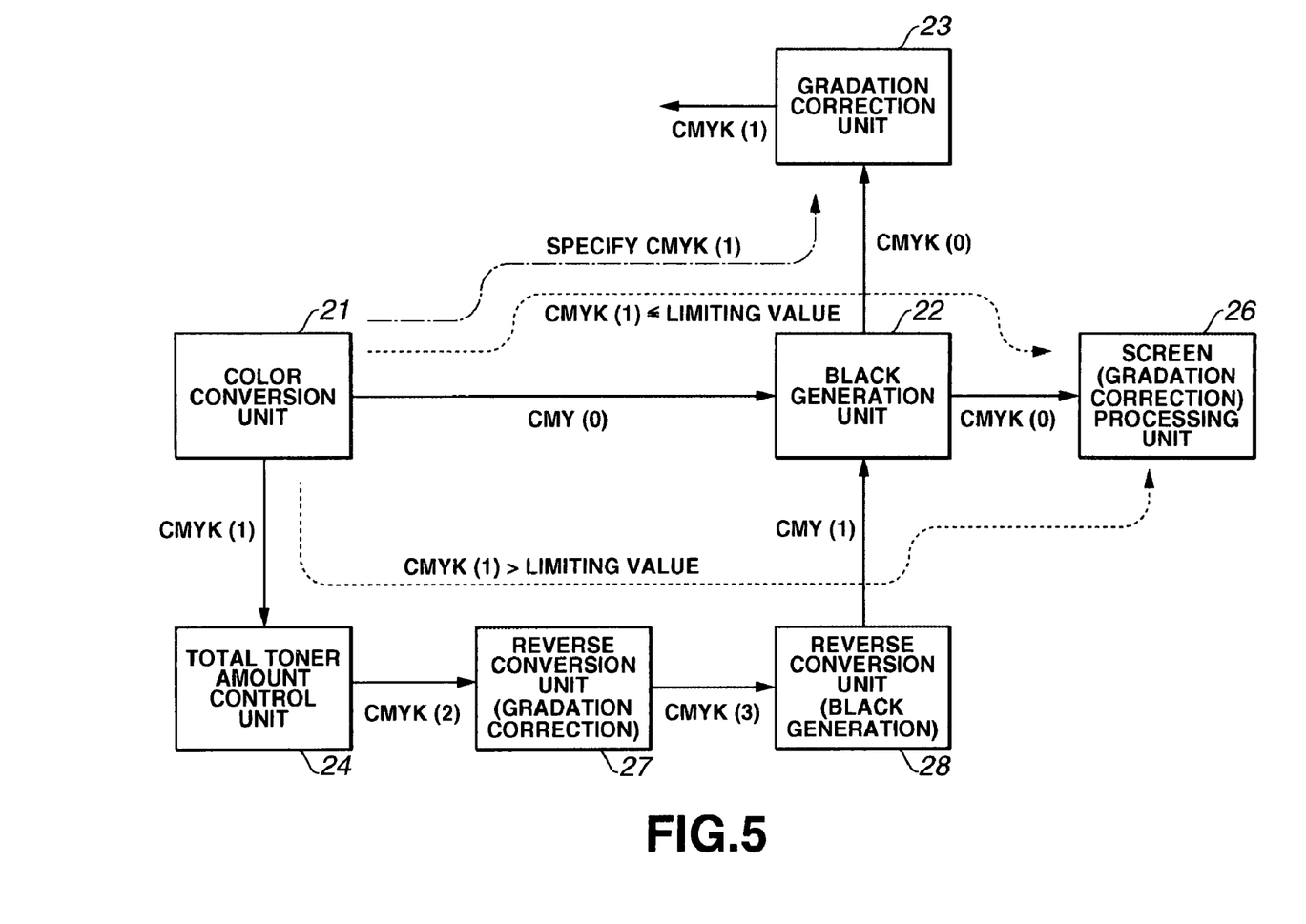
FIG. 5 is a diagram illustrating an operation of an image processing section 20.

Now, an operation of the image processing section 20 will be described. FIG. 5 is a diagram illustrating the operation of the image processing section 20.

In the image processing section 20, the image data CMY (0) which has outputted by the color conversion unit 21 is subjected to a black generation processing by the black generation unit 22, and the resulting image data CMYK (0) is subjected to a different processing on the basis of the image data CMYK (1) which has undergone the gradation correction executed by the gradation correction unit 23.

In a case where the total toner amount of the image data CMYK (1) exceeds a limiting value indicating the ability of the output processing section 104, the total toner amount is suppressed by the total toner amount control unit 24 with respect to the image data CMYK (1) outputted by the color conversion unit 21, and the resulting output image data CMYK (2) is subjected to the reverse conversion processing by the reverse conversion unit 27. And, image data CMYK (3) resulting from the reverse conversion is further subjected to the reverse conversion processing by the reverse conversion unit 28, the resulting image data CMY (1) is subjected to the black generation processing by the black generation unit 22, and the resulted image data CMYK (0) is subjected to a screen processing by the screen processing unit 26.

Meanwhile, in a case where the total toner amount of the image data CMYK (1) is not more than the limiting value indicating the ability of the output processing section 104, the image data CMY (0) outputted by the color conversion unit 21 is subjected to a black generation processing by the black generation unit 22, and the resulting image data CMYK (0) is subjected to a screen processing by the screen processing unit 26 (resulting in output of the CMYK (1)).

In a case where the image processing section is configured by having both hardware and software by changing the total toner amount control unit to an arbitrary position as in the structure shown in Embodiment 2, its flexibility can be improved.

As stated above, a first aspect of the present invention provides an image processing apparatus for converting inputted image data to image data in accordance with characteristics of an image forming unit, including: a first gradation correction unit which performs a gradation correction processing of the inputted image data in accordance with the characteristics of the image forming unit; a total toner amount control unit which performs a total toner amount control processing of the image data which has undergone at least the gradation correction processing executed by the first gradation correction unit; and a second gradation correction unit which performs a gradation correction processing in accordance with the characteristics of the image forming unit with respect to the image data which has undergone at least the total toner amount control processing executed by the total toner amount control unit.

A second aspect of the present invention is the image processing apparatus according to the first aspect of the invention, further including a reverse correction unit which performs a reverse correction processing of the gradation correction processing executed by the first gradation correction unit with respect to the image data which has undergone at least the total toner amount control processing executed by the total toner amount control unit, in which the second gradation correction unit may perform the gradation correction processing in accordance with the characteristics of the image forming unit with respect to the image data which has undergone at least the reverse correction processing executed by the reverse correction unit.

A third aspect of the present invention is the image processing apparatus according to the second aspect of the invention, in which the reverse correction processing performed by the reverse correction processing unit may have precision higher than that of the gradation correction processing which is performed by the first gradation correction unit.

A fourth aspect of the present invention is the image processing apparatus according to the first aspect of the invention claim 1, in which the second gradation correction unit may perform a screen processing of the image data together with the gradation correction processing executed in accordance with the characteristics of the image forming unit.

A fifth aspect of the present invention provides an image processing apparatus for converting inputted image data to image data in accordance with characteristics of an image forming unit, including: a first gradation correction unit which performs a gradation correction processing of the inputted image data in accordance with the characteristics of the image forming unit; a total toner amount control unit which determines whether or not it is necessary to perform a total toner amount control processing on the basis of the image data which has undergone the gradation correction processing executed by the first gradation correction unit; and a second gradation correction unit which performs a gradation correction processing in accordance with the characteristics of the image forming unit with respect to the image data which has undergone the total toner amount control processing executed by the total toner amount control unit in a case where it is determined by the total toner amount control unit that the total toner amount control processing is necessary, and performs a gradation correction processing in accordance with the characteristics of the image forming unit with respect to the image data which has not undergone the gradation correction processing executed by the first gradation correction unit in a case where it is determined by the total toner amount control unit that the total toner amount control processing is not necessary.

A sixth aspect of the present invention is the image processing apparatus according to the fifth aspect of the invention, in which the total toner amount control unit may perform the total toner amount control processing of the image data which has undergone the gradation correction processing executed by the first gradation correction unit when it is judged necessary to perform the total toner amount control processing.

A seventh aspect of the present invention is the image processing apparatus according to the sixth aspect of the invention claim 6, which may further include a reverse correction unit which performs a reverse correction processing of the gradation correction processing by the first gradation correction unit with respect to the image data which has undergone at least the total toner amount control processing executed by the total toner amount control unit, in which the second gradation correction unit may perform the gradation correction processing in accordance with the characteristics of the image forming unit with respect to the image data which has undergone at least the reverse correction processing executed by the reverse correction unit.

An eighth aspect of the present invention is the image processing apparatus according to the seventh aspect of the invention, in which the reverse correction processing performed by the reverse correction processing unit may have precision higher than that of the gradation correction processing performed by the first gradation correction unit.

A ninth aspect of the present invention is the image processing apparatus according to the fifth aspect of the invention, in which the second gradation correction unit may perform a screen processing of the image data together with the gradation correction processing executed in accordance with the characteristics of the image forming unit.

A tenth aspect of the present invention is the image processing apparatus according to claim 5, which may further include: a reverse correction unit which performs on image data a reverse correction processing of the gradation correction processing executed by the first gradation correction unit; a black generation unit which performs on image data a black generation processing; and a reverse black generation correction unit which performs on image data a reverse correction processing of the black generation processing executed by the black generation unit, in which: in a case where it is determined by the total toner amount control unit that the total toner amount control processing is necessary, the image data which has undergone the total toner amount control processing executed by the total toner amount control unit may be subjected to the reverse correction processing by the reverse correction unit, the reverse correction processing by the reverse black generation correction unit, the black generation processing by the black generation unit, and the gradation correction processing by the second gradation correction unit; and in a case where it is determined by the total toner amount control unit that the total toner amount control processing is unnecessary, image data, which has not undergone any of the gradation correction processing executed by the first gradation correction unit, the total toner amount control processing by the total toner amount control unit, the reverse correction processing by the reverse correction unit, and the reverse correction processing by the black generation correction unit, may be subjected to the black generation processing by the black generation unit and the gradation correction processing by the second gradation correction unit.

An eleventh aspect of the present invention provides an image processing apparatus which is provided with a plurality of correction units including a screen processing unit which performs a gradation correction processing and a screen processing, and converts inputted image data to image data in accordance with characteristics of an image forming unit, including: a total toner amount control unit which performs a total toner amount control processing, in which the total toner amount control unit is disposed in a previous stage of the plurality of correction units including at least the screen processing unit.

A twelfth aspect of the present invention is the image processing apparatus according to the eleventh aspect of the invention, in which the correction unit which is disposed in a latter stage of the total toner amount control unit includes a pair of a first correction unit which performs a prescribed correction processing and a second correction unit which performs a reverse correction processing of the correction processing executed by the first correction unit.

A thirteenth aspect of the present invention is the image processing apparatus according to the twelfth aspect of the invention, in which the first correction unit may include the screen processing unit; and the second correction unit may include a reverse gradation correction unit which performs a reverse correction processing of the gradation correction processing executed by the screen processing unit.

A fourteenth aspect of the present invention is the image processing apparatus according to the twelfth or the thirteenth aspect of the invention, in which: the first correction unit may include a black generation unit which performs a black generation processing; and the second correction unit may include a reverse black generation correction unit which performs a reverse correction processing of the black generation processing executed by the black generation unit.

A fifteenth aspect of the present invention provides an image processing method which is executed by an image processing apparatus for converting inputted image data to image data in accordance with characteristics of an image forming unit, including: executing an image processing in order of a first gradation correction processing in accordance with the characteristics of the image forming unit, a total toner amount control processing for controlling a total toner amount, and a second gradation correction processing in accordance with the characteristics of the image forming unit.

A sixteenth aspect of the present invention is the image processing method according to the fifteenth aspect of the invention, in which the image data which has undergone at least the total toner amount control processing may be subjected to a reverse correction processing of the first gradation correction processing, and the image data which has undergone at least the reverse correction processing may be subjected to the second gradation correction processing.

A seventeenth aspect of the present invention is the image processing method according to the sixteenth aspect of the invention, in which the reverse correction processing may have precision higher than that of the first gradation correction processing.

An eighteenth aspect of the present invention is the image processing method according to the fifteenth aspect of the invention, in which the second gradation correction processing may be executed together with the screen processing.

A nineteenth aspect of the present invention provides an image processing method which is executed by an image processing apparatus for converting inputted image data to image data in accordance with characteristics of an image forming unit, including: performing the first gradation correction processing in accordance with the characteristics of the image forming unit with respect to the inputted image data, and judging whether or not it is necessary to perform the total toner amount control processing on the basis of the image data which has undergone the first gradation correction processing; performing the second gradation correction processing in accordance with the characteristics of the image forming unit with respect to the image data which has undergone the total toner amount control processing when it is judged that the total toner amount control processing is necessary; and performing the second gradation correction processing in accordance with the characteristics of the image forming unit with respect to the image data which has not undergone the first gradation correction processing when it is judged that the total toner amount control processing is unnecessary.

A twentieth aspect of the present invention is the image processing method according to the nineteenth aspect of the invention, in which the image data which has undergone the first gradation correction processing may be subjected to the total toner amount control processing.

A twenty-first aspect of the present invention is the image processing method according to the twentieth aspect of the invention, in which the image data which has undergone at least the total toner amount control processing may be subjected to a reverse correction processing of the first gradation correction processing, and the image data which has undergone the reverse correction processing may be subjected to the second gradation correction processing.

A twenty-second aspect of the present invention is the image processing method according to the twenty-first aspect of the invention, in which the reverse correction processing may have precision higher than that of the first gradation correction processing.

A twenty-third aspect of the present invention is the image processing method according to the nineteenth aspect of the invention, in which a screen processing may be performed together with the second gradation correction processing.

A twenty-fourth aspect of the present invention is the image processing method according to the nineteenth aspect of the invention, in which: in a case where it is judged necessary to perform the total toner amount control processing, the image data which has undergone the total toner amount control processing may be subjected to a reverse correction processing of the first gradation correction processing, a black generation processing, a reverse correction processing of the black generation processing, and the second gradation correction processing; and in a case where it is judged unnecessary to perform the total toner amount control processing, image data which has not undergone any of the first gradation correction processing, the total toner amount control processing, a reverse correction processing of the first gradation correction processing, and a reverse correction processing of the black generation processing, may be subjected to the black generation processing and the second gradation correction processing.

A twenty-fifth aspect of the present invention provides an image control method which is performed by an image processing apparatus which is provided with a plurality of correction units including a screen processing unit for performing a gradation correction processing and a screen processing, and converts inputted image data to image data in accordance with characteristics of an image forming unit, including: performing a total toner amount control processing in a stage prior to a plurality of correction processings including at least a gradation correction processing effected by the screen processing unit.

A twenty-sixth aspect of the present invention is the image processing method according to the twenty-fifth aspect of the invention, in which a correction processing performed in a latter stage of the total toner amount control processing may include a pair of a prescribed correction processing and a reverse correction processing of the prescribed correction processing.

A twenty-seventh aspect of the present invention is the image processing method according to the twenty-sixth aspect of the invention, in which the correction processing performed in the latter stage of the total toner amount control processing may include at least a pair of the gradation correction processing executed by the screen processing unit and a reverse correction processing of the gradation correction processing.

A twenty-eighth aspect of the present invention is the image processing method according to the twenty-sixth or the twenty-seventh aspect of the invention, in which the correction processing performed in the latter stage of the total toner amount control processing may include at least a pair of a black generation processing and a reverse correction processing of the black generation processing.

According to the present invention, the appropriate total toner amount control can be performed without deteriorating the gradation even when the total toner amount control is performed prior to the gradation correction, and the image quality can be improved.

The foregoing description of the embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling other skilled in the art to understand the invention for various embodiments and with the various modifications as are suited to the particular use contemplated. It is intended that the scope of the invention be defined by the following claims and their equivalents.

The entire disclosure of Japanese Patent Application No. 2005-266963 filed on Sep. 14, 2005 including specification, claims, drawings and abstract is incorporated herein by reference in its entirety.

What is claimed is:

1. An image processing apparatus for converting inputted image data to image data in accordance with characteristics of an image forming unit, comprising:
   a first gradation correction unit which performs a gradation correction processing of the inputted image data in accordance with the characteristics of the image forming unit;
   a total toner amount control unit which performs a total toner amount control processing of the image data which has undergone at least the gradation correction processing executed by the first gradation correction unit;
   a second gradation correction unit which performs a gradation correction processing in accordance with the characteristics of the image forming unit with respect to the image data which has undergone at least the total toner amount control processing executed by the total toner amount control unit; and
   a reverse correction unit which performs a reverse correction processing of the gradation correction processing executed by the first gradation correction unit with respect to the image data which has undergone at least the total toner amount control processing executed by the total toner amount control unit,
   wherein the second gradation correction unit performs the gradation correction processing in accordance with the characteristics of the image forming unit with respect to the image data which has undergone at least the reverse correction processing executed by the reverse correction unit.

2. The image processing apparatus according to claim 1, wherein the reverse correction processing performed by the reverse correction processing unit has precision higher than that of the gradation correction processing which is performed by the first gradation correction unit.

3. The image processing apparatus according to claim 1, wherein the second gradation correction unit performs a screen processing of the image data together with the gradation correction processing executed in accordance with characteristics of the image forming unit.

4. An image processing apparatus for converting inputted image data to image data in accordance with characteristics of an image forming unit, comprising:
   a first gradation correction unit which performs a gradation correction processing of the inputted image data in accordance with the characteristics of the image forming unit;
   a total toner amount control unit which determines whether or not it is necessary to perform a total toner amount control processing on the basis of the image data which has undergone the gradation correction processing executed by the first gradation correction unit;
   a second gradation correction unit which performs a gradation correction processing in accordance with the characteristics of the image forming unit with respect to the image data which has undergone the total toner amount control processing executed by the total toner amount control unit in a case where it is determined by the total toner amount control unit that the total toner amount control processing is necessary, and performs a gradation correction processing in accordance with the characteristics of the image forming unit with respect to the image data which has not undergone the gradation correction processing executed by the first gradation correction unit in a case where it is determined by the total toner amount control unit that the total toner amount control processing is not necessary; and
   a reverse correction unit which performs a reverse correction processing of the gradation correction processing by the first gradation correction unit with respect to the image data which has undergone at least the total toner amount control processing executed by the total toner amount control unit,
   wherein the total toner amount control unit performs the total toner amount control processing of the image data which has undergone the gradation correction processing executed by the first gradation correction unit when it is judged necessary to perform the total toner amount control processing, and
   wherein the second gradation correction unit performs the gradation correction processing in accordance with the characteristics of the image forming unit with respect to the image data which has undergone at least the reverse correction processing executed by the reverse correction unit.

5. The image processing apparatus according to claim 4, wherein the reverse correction processing performed by the reverse correction processing unit has precision higher than that of the gradation correction processing performed by the first gradation correction unit.

6. The image processing apparatus according to claim 4, wherein the second gradation correction unit performs a screen processing of the image data together with the gradation correction processing executed in accordance with the characteristics of the image forming unit.

7. The image processing apparatus according to claim 4, further comprising:
- a black generation unit which performs on image data a black generation processing; and
- a reverse black generation correction unit which performs on image data a reverse correction processing of the black generation processing executed by the black generation unit, wherein:
- in a case where it is determined by the total toner amount control unit that the total toner amount control processing is necessary, the image data which has undergone the total toner amount control processing executed by the total toner amount control unit is subjected to the reverse correction processing by the reverse correction unit, the reverse correction processing by the reverse black generation correction unit, the black generation processing by the black generation unit, and the gradation correction processing by the second gradation correction unit; and
- in a case where it is determined by the total toner amount control unit that the total toner amount control processing is unnecessary, image data, which has not undergone any of the gradation correction processing executed by the first gradation correction unit, the total toner amount control processing by the total toner amount control unit, the reverse correction processing by the reverse correction unit, and the reverse correction processing by the black generation correction unit, is subjected to the black generation processing by the black generation unit and the gradation correction processing by the second gradation correction unit.

8. An image processing apparatus which is provided with a plurality of correction units including a screen processing unit which performs a gradation correction processing and a screen processing, and converts inputted image data to image data in accordance with characteristics of an image forming unit, comprising:
- a total toner amount control unit which performs a total toner amount control processing, wherein:
- the total toner amount control unit is disposed in a previous stage of the plurality of correction units including at least the screen processing unit,
- the correction unit which is disposed in a latter stage of the total toner amount control unit includes a pair of a first correction unit which performs a prescribed correction processing and a second correction unit which performs a reverse correction processing of the correction processing executed by the first correction unit,
- the first correction unit includes the screen processing unit; and
- the second correction unit includes a reverse gradation correction unit which performs a reverse correction processing of the gradation correction processing executed by the screen processing unit.

9. The image processing apparatus according to claim 8, wherein:
- the first correction unit includes a black generation unit which performs a black generation processing; and
- the second correction unit includes a reverse black generation correction unit which performs a reverse correction processing of the black generation processing executed by the black generation unit.

10. An image processing method which is executed by an image processing apparatus for converting inputted image data to image data in accordance with characteristics of an image forming unit, comprising:
- executing an image processing in order of a first gradation correction processing in accordance with the characteristics of the image forming unit, a total toner amount control processing for controlling a total toner amount, and a second gradation correction processing in accordance with the characteristics of the image forming unit; and
- forming an image corresponding to the image data converted in accordance with the characteristics of the image forming unit by an output processing section of the image processing apparatus,
- wherein the image data which has undergone at least the total toner amount control processing is subjected to a reverse correction processing of the first gradation correction processing, and the image data which has undergone at least the reverse correction processing is subjected to the second gradation correction processing.

11. The image processing method according to claim 10, wherein the reverse correction processing has precision higher than that of the first gradation correction processing.

12. The image processing method according to claim 10, wherein the second gradation correction processing is executed together with the screen processing.

13. An image processing method which is executed by an image processing apparatus for converting inputted image data to image data in accordance with characteristics of an image forming unit, comprising:
- performing a first gradation correction processing in accordance with the characteristics of the image forming unit with respect to the inputted image data, and judging whether or not it is necessary to perform a total toner amount control processing on the basis of the image data which has undergone the first gradation correction processing;
- performing a second gradation correction processing in accordance with the characteristics of the image forming unit with respect to the image data which has undergone the total toner amount control processing when it is judged that the total toner amount control processing is necessary;
- performing the second gradation correction processing in accordance with the characteristics of the image forming unit with respect to the image data which has not undergone the first gradation correction processing when it is judged that the total toner amount control processing is unnecessary; and
- forming an image corresponding to the image data converted in accordance with the characteristics of the image forming unit by an output processing section of the image processing apparatus,
- wherein the image data which has undergone the first gradation correction processing is subjected to the total toner amount control processing, and
- wherein the image data which has undergone at least the total toner amount control processing is subjected to a reverse correction processing of the first gradation correction processing, and the image data which has undergone the reverse correction processing is subjected to the second gradation correction processing.

14. The image processing method according to claim 13, wherein the reverse correction processing has precision higher than that of the first gradation correction processing.

15. The image processing method according to claim 13, wherein a screen processing is performed together with the second gradation correction processing.

16. The image processing method according to claim 13, wherein:

in a case where it is judged necessary to perform the total toner amount control processing, the image data which has undergone the total toner amount control processing is subjected to a reverse correction processing of the first gradation correction processing, a black generation processing, a reverse correction processing of the black generation processing, and the second gradation correction processing; and in a case where it is judged unnecessary to perform the total toner amount control processing, image data which has not undergone any of the first gradation correction processing, the total toner amount control processing, a reverse correction processing of the first gradation correction processing, and a reverse correction processing of the black generation processing, is subjected to the black generation processing and the second gradation correction processing.

17. An image control method which is performed by an image processing apparatus which is provided with a plurality of correction units including a screen processing unit for performing a gradation correction processing and a screen processing, and converts inputted image data to image data in accordance with characteristics of an image forming unit, comprising:

performing a total toner amount control processing in a stage prior to a plurality of correction processings including at least a gradation correction processing effected by the screen processing unit; and forming an image corresponding to the image data converted in accordance with the characteristics of the image forming unit by an output processing section of the image processing apparatus, wherein a correction processing performed in a latter stage of the total toner amount control processing includes a pair of a prescribed correction processing and a reverse correction processing of the prescribed correction processing, and wherein the correction processing performed in the latter stage of the total toner amount control processing includes at least a pair of the gradation correction processing executed by the screen processing unit and a reverse correction processing of the gradation correction processing.

18. The image processing method according to claim 17, wherein the correction processing performed in the latter stage of the total toner amount control processing includes at least a pair of a black generation processing and a reverse correction processing of the black generation processing.

19. The image processing apparatus according to claim 1, further comprising:

a color conversion unit that receives RGB image data as the inputted image data and converts the RGB image data to CMY image data; and a generation unit that receives the CMY image data and converts the CMY image data to CMYK image data.

20. The image processing apparatus according to claim 1, wherein the gradation correction comprises receiving image data as input data having an input value and converting the received image data into output data having output value using a Tone Reproduction Curve (TRC).

* * * * *